(12) United States Patent
Kraus (10) Patent No.: US 10,806,090 B2
(45) Date of Patent: Oct. 20, 2020

(54) AGRICULTURAL BALER SYSTEM INCLUDING CROP PACKAGE RECONFIGURATION AND BANDING MECHANISM AND METHOD

(71) Applicant: Deere & Company, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 206 days.

(21) Appl. No.: 16/031,706

(22) Filed: Jul. 10, 2018

(65) Prior Publication Data

US 2020/0015427 A1    Jan. 16, 2020

(51) Int. Cl.
*A01F 15/07* (2006.01)
*A01F 15/08* (2006.01)
(Continued)

(52) U.S. Cl.
CPC ........ *A01F 15/0833* (2013.01); *A01F 15/005* (2013.01); *A01F 15/0715* (2013.01);
(Continued)

(58) Field of Classification Search
CPC ....... B65B 13/04; B65B 13/06; B65B 27/125; B65B 13/20; A01F 15/005; A01F 15/02;
(Continued)

(56) References Cited

U.S. PATENT DOCUMENTS

| 3,195,445 A | 7/1965 | Meisler |
| 4,177,723 A | 12/1979 | Buchele et al. |

(Continued)

FOREIGN PATENT DOCUMENTS

| DE | 10131165 A1 | 2/2003 |
| EP | 0803183 A1 | 10/1997 |

(Continued)

OTHER PUBLICATIONS

YouTube, "Round Bale Press," <https://www.youtube.com/watch?v=6wCJFnrXBmA> webpage publically available at least as early as Mar. 31, 2014.

(Continued)

*Primary Examiner* — Jimmy T Nguyen
(74) *Attorney, Agent, or Firm* — Michael Best & Friedrich LLP (57) ABSTRACT

A system is configured to prepare and band a crop package. The system includes an agricultural baler configured to move relative to a surface. The agricultural baler includes a formation chamber configured to form the crop package into a substantially cylindrical shape. The agricultural baler also includes a banding mechanism configured to band the crop package within the formation chamber in the cylindrical shape with a first banding element. The system also includes a mobile reconfiguration and bander assembly configured to move relative to the surface. The reconfiguration and bander assembly is configured to form the cylindrical shaped crop package into a substantially different shape and to band the crop package in the different shape with a second banding element.

20 Claims, 8 Drawing Sheets

(51) Int. Cl.
*B65B 13/20* (2006.01)
*B65B 13/06* (2006.01)
*A01F 15/00* (2006.01)

(52) U.S. Cl.
CPC .............. *B65B 13/06* (2013.01); *B65B 13/20* (2013.01); *A01F 2015/074* (2013.01); *A01F 2015/0745* (2013.01)

(58) Field of Classification Search
CPC ........ A01F 15/04; A01F 15/046; A01F 15/07; A01F 15/071; A01F 15/0715; A01F 15/0875; A01F 15/0883; A01F 15/14; A01F 15/141; A01F 2015/0795; A01F 2015/0775; A01F 2015/183; A01D 85/005; A01D 2085/007; A01D 2085/008
See application file for complete search history.

(56) References Cited

U.S. PATENT DOCUMENTS

| | | | |
|---|---|---|---|
| 4,697,510 A * | 10/1987 | Cranston, III | B65B 13/06 100/14 |
| 6,425,235 B1 * | 7/2002 | Spaniol | A01D 85/005 56/474 |
| 6,499,525 B1 | 12/2002 | Lai | |
| 6,769,353 B1 * | 8/2004 | Smith | A01F 15/141 100/13 |
| 6,840,023 B2 | 1/2005 | Roth et al. | |
| 6,901,719 B2 | 6/2005 | Viaud | |
| 7,127,985 B2 * | 10/2006 | Standlee | A01F 15/005 100/3 |
| 7,237,478 B1 | 7/2007 | Gosis et al. | |
| 8,230,663 B2 | 7/2012 | Viaud | |
| 8,833,247 B2 | 9/2014 | Dlander | |
| 9,205,938 B2 | 12/2015 | Stein et al. | |
| 9,351,444 B2 | 5/2016 | Keller | |
| 9,622,420 B2 * | 4/2017 | Kraus | B65G 47/967 |
| 2010/0322538 A1 * | 12/2010 | Powell | B65D 19/36 383/16 |
| 2012/0210888 A1 * | 8/2012 | Olander | A01F 15/005 100/40 |
| 2016/0113206 A1 * | 4/2016 | Kraus | A01F 15/145 56/433 |
| 2016/0235008 A1 | 8/2016 | Keller | |

FOREIGN PATENT DOCUMENTS

| | | |
|---|---|---|
| EP | 2628591 A2 | 8/2013 |
| EP | 3461321 A1 | 4/2019 |
| EP | 3461322 A1 | 4/2019 |
| WO | 2015153300 A1 | 10/2015 |

OTHER PUBLICATIONS

European Search Report issued in counterpart European Patent Application No. 19184166.7 dated Dec. 13, 2019 (06 pages).

* cited by examiner

AGRICULTURAL BALER SYSTEM INCLUDING CROP PACKAGE RECONFIGURATION AND BANDING MECHANISM AND METHOD

BACKGROUND

The present disclosure relates to agricultural balers, and more particularly to a banding mechanism of an agricultural baler that wraps at least one banding element around an agricultural crop package.

SUMMARY

In one aspect, a system is configured to prepare and band a crop package. The system includes an agricultural baler having a formation chamber configured to form the crop package into a substantially cylindrical shape. The agricultural baler also includes a banding mechanism configured to band the crop package within the formation chamber in the cylindrical shape with a first banding element. The system also includes a reconfiguration and bander assembly coupled to the agricultural baler. The reconfiguration and bander assembly is configured to form the cylindrical shaped crop package into a substantially different shape and to band the crop package in the different shape with a second banding element.

In another aspect, a system is configured to prepare and band a crop package. The system includes an agricultural baler configured to move relative to a surface. The agricultural baler includes a formation chamber configured to form the crop package into a substantially cylindrical shape. The agricultural baler also includes a banding mechanism configured to band the crop package within the formation chamber in the cylindrical shape with a first banding element. The system also includes a mobile reconfiguration and bander assembly configured to move relative to the surface. The reconfiguration and bander assembly is configured to form the cylindrical shaped crop package into a substantially different shape and to band the crop package in the different shape with a second banding element.

In yet another aspect, a method of preparing and banding a crop package includes forming the crop package into a cylindrical shape within a formation chamber of an agricultural baler, banding the crop package within the formation chamber in the cylindrical shape with a first banding element, moving a reconfiguration and bander assembly relative to an agricultural surface supporting the agricultural baler, forming the crop package into a substantially different shape with the reconfiguration and bander assembly, and banding the crop package in the different shape with the reconfiguration and bander assembly using a second banding element.

Other aspects of the disclosure will become apparent by consideration of the detailed description and accompanying drawings.

2

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Terms of degree, such as "substantially" or "approximately" are understood by those of ordinary skill to refer to reasonable ranges outside of the given value, for example, general tolerances associated with manufacturing, assembly, and use of the described embodiments.

Figure 1:
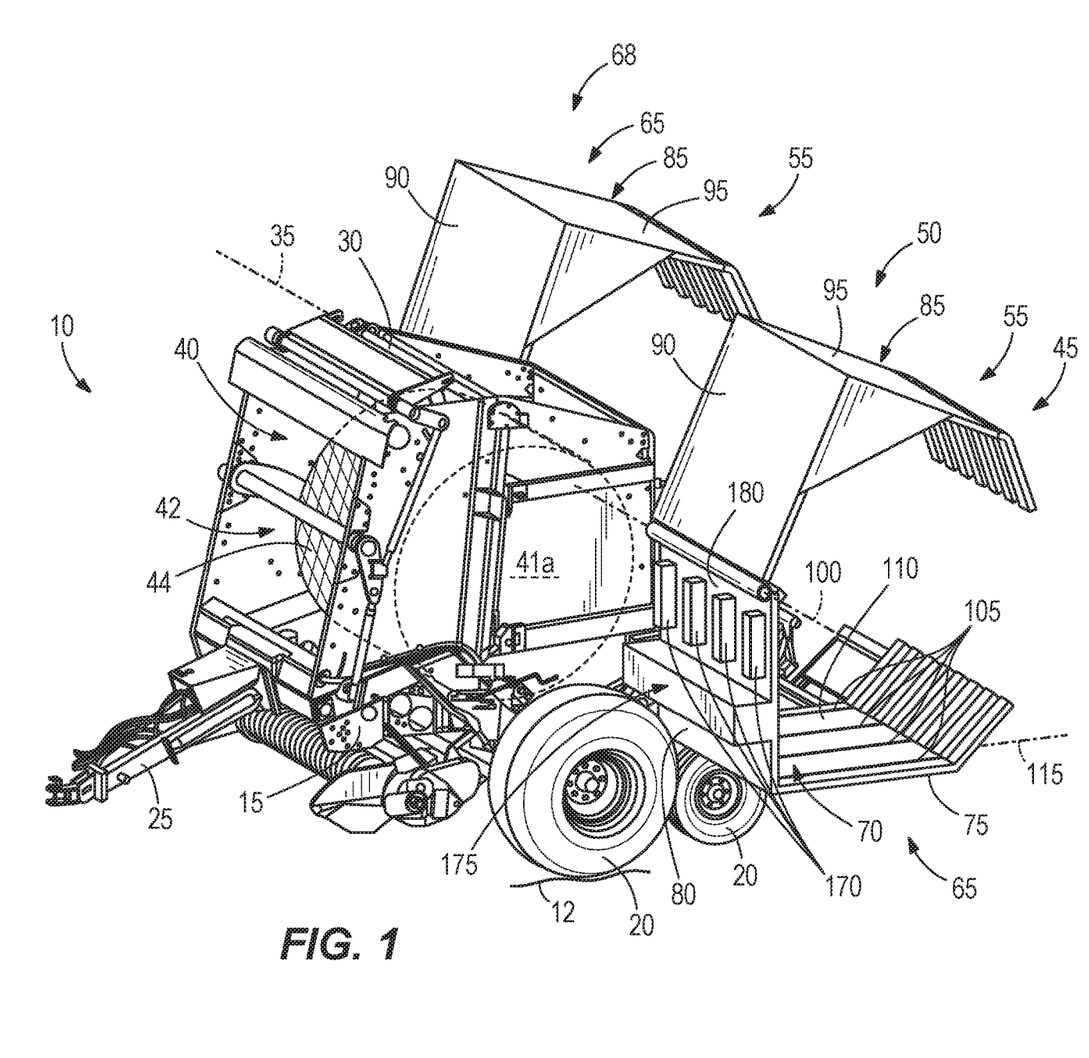
FIG. 1 is a front perspective view of an agricultural baler including a crop package reconfiguration and banding mechanism according to an embodiment of the disclosure.
Figure 2:
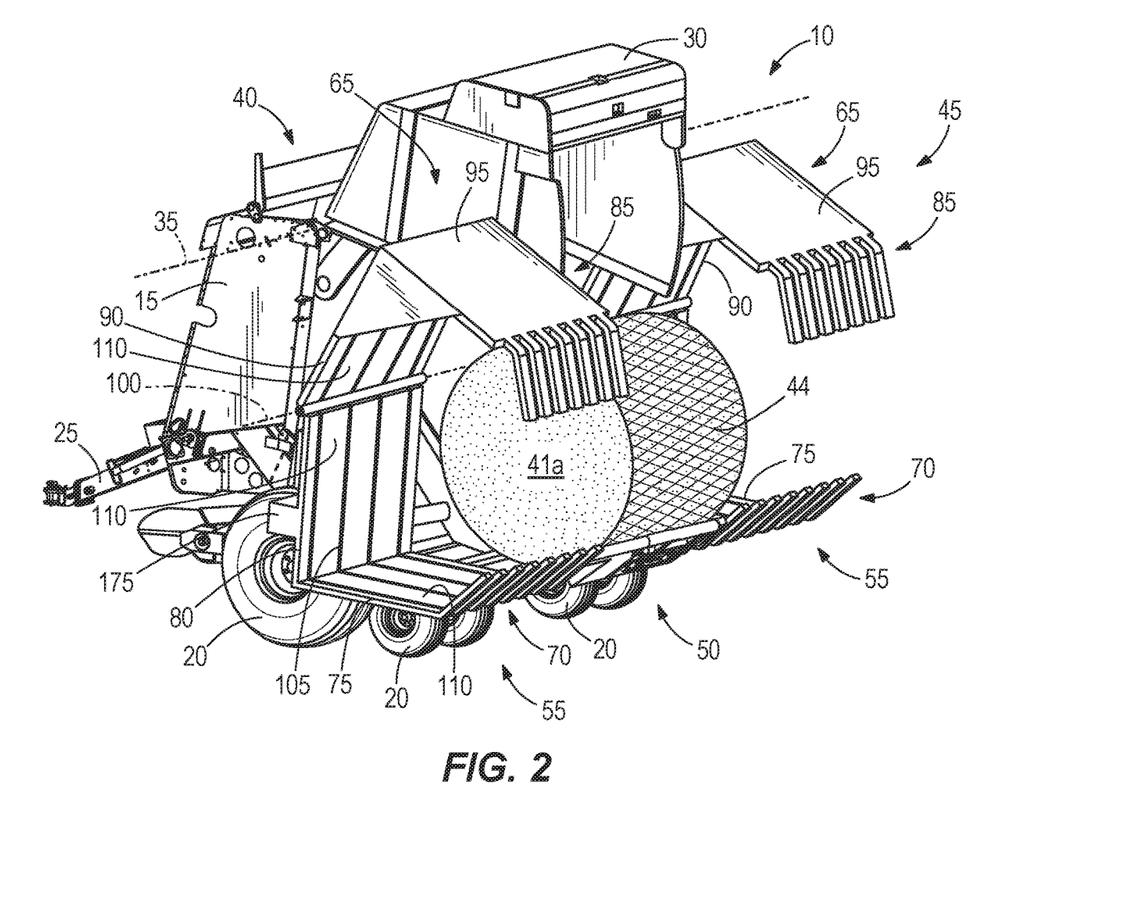
FIG. 2 is a rear perspective view of the agricultural baler of FIG. 1 illustrating an accumulator of the agricultural baler supporting a first crop package secured within a cylindrical shape by a first banding element.

FIG. 1 illustrates an agricultural baler 10 selectively coupled to a vehicle (e.g., tractor) for the vehicle to move the agricultural baler 10 through an agricultural field or surface 12. The baler 10 includes a chassis 15, wheels 20 rotatably coupled to the chassis 15 to support the baler 10 above the agricultural field, a tongue 25 coupled to a front portion of the chassis 15 allowing the baler 10 to be towed behind the vehicle, and a gate 30 pivotably coupled to the chassis 15 about a gate axis 35 between a closed position (FIG. 1) and an open position (FIG. 2). A formation chamber 40 is defined between the chassis 15 and the gate 30—when the gate 30 is in the closed position—and is operable to form a crop package 41*a* as the baler 10 moves through the agricultural field. The illustrated baler 10 also includes a banding mechanism 42 (the entirety of the banding mechanism 42 is not illustrated in FIG. 1) positioned within the formation chamber 40 that secures a fully formed crop package 41*a* created within the formation chamber 40 in a particular shape using a first banding element 44. The illustrated first banding element 44 is net wrap material. In other embodiments, the first banding element 44 can be, for example, twine, rope(s), strap(s), wire(s), etc. In the illustrated embodiment, the baler 10 is a "round" baler such that the banding mechanism 42 bands generally cylindrical-shaped crop packages 41a within the formation chamber 40, however, in other embodiments, the baler 10 can be a "square" baler such that the banding mechanism 42 bands generally cuboid-shaped (e.g., cube, rectangular prism, etc.) crop packages within the formation chamber 40. In general, the cylindrical-shaped crop packages include a planar side surface being generally circular in shape, and the cuboid-shaped crop packages include a corresponding planar side surface (relative to the planar side surfaces of the cylindrical-shaped crop packages) being generally square or rectangular in shape. In further embodiments, the gate 30 can be slidably coupled to the chassis 15 between the closed position and the open position.

Figure 4:
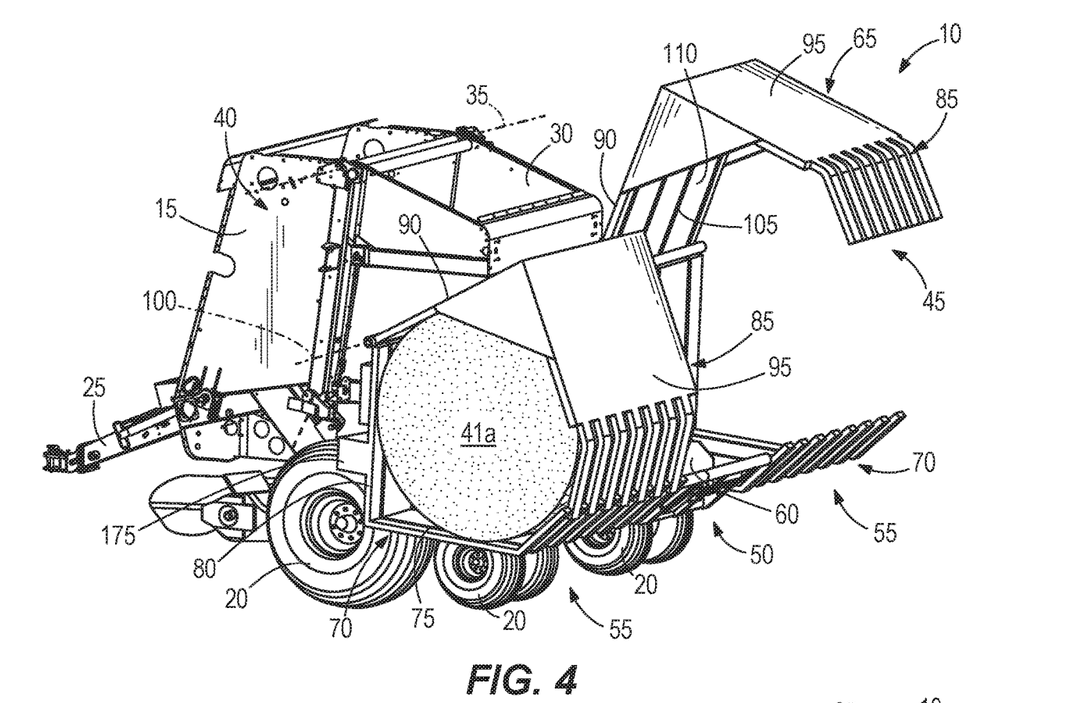
FIG. 4 is another view of the agricultural baler of FIG. 3 illustrating the crop package reconfiguration and banding mechanism in a first position.

The illustrated baler 10 also includes an accumulator 45 positioned downstream of the formation chamber 40 and operable to support one or more crop packages 41a that are discharged sequentially from the formation chamber 40—when the gate 30 is in the open position. The accumulator 45 includes a middle section 50 positioned between two side sections 55 with each section 50, 55 operable to support one crop package 41a above the agricultural field. A pushing mechanism 60 (e.g., a pushing plate or a slider; FIG. 4) is slidable within the middle section 50 to push a crop package 41a supported on the middle section 50 to one of the two side sections 55. In the illustrated embodiment, each side section 55 is substantially the same such that features of one side section 55 are applicable to the other side section 55. As such, only one of the side sections 55 will be discussed in detail below.

With continued reference to FIG. 1, the illustrated side section 55 defines a reconfiguration and banding mechanism or assembly 65 (e.g., a bander assembly) operable to change the shape of the crop package 41a discharged from the formation chamber 40 and to band or secure the crop package 41a into the new shape. In the illustrated embodiment, the baler 10 and the reconfiguration and banding mechanism 65 are coupled together to form a baler system 68. The illustrated reconfiguration and banding mechanism 65 includes a first support frame 70 having a bottom support plate 75 and a first side support plate 80 oriented substantially perpendicular to the bottom support plate 75 such that the first support frame 70 is generally L-shaped in cross section (e.g., within a cross sectional plane perpendicular to the gate axis 35 or a rotational axis of the wheels 20). The reconfiguration and banding mechanism 65 also includes a second support frame 85 having a top support plate 90 and a second side support plate 95 oriented substantially perpendicular to the top support plate 90 such that the second support frame 85 is also generally L-shaped in cross section similar to the first support frame 70. Accordingly, the first and second support frames 70, 85 collectively define four support plates. In other embodiments, first support frame 70 can include more or less than two support plates and/or the second support frame 85 can include more or less than two support plates with the total sum of the support plates being four. The illustrated first and second support frames 70, 85 are pivotably coupled together about a pivot axis 100 that is oriented substantially parallel with the gate axis 35 or the rotational axis of the wheels 20. In other embodiments, the second support frame 85 can be slidably coupled to the first support frame 70. In further embodiments, the reconfiguration and banding mechanism 65 can define the middle section 50 of the accumulator 45 with the two side sections 55 operable to simply support the crop packages above the agricultural field. In other words, the baler 10 can include one reconfiguration and banding mechanism 65 rather than two.

Each support plate or member 75, 80, 90, 95 includes a plurality of channels 105 formed into an abutting surface 110 of each support plate 75, 80, 90, 95 such that each channel 105 is centered on a plane that is substantially perpendicular to the gate axis 35 or the rotational axis of the wheels 20. Stated another way, each channel 105 defines a longitudinal axis 115 oriented substantially perpendicular to the gate axis 35 or the rotational axis of the wheels 20 (only one longitudinal axis 115 is illustrated in FIG. 1). The abutting surfaces 110 are configured to contact the crop package 41a when the crop package 41a is received by the reconfiguration and banding mechanism 65. In the illustrated embodiment, each support plate 75, 80, 90, 95 includes four channels 105, but in other embodiments, the support plates 75, 80, 90, 95 can include more or less than four channels 105. Each channel of the plurality of channels 105 can include a particular geometry within a plane perpendicular to its corresponding longitudinal axis 115. For example, one or more channels of the plurality of channels 105 can include a channel geometry as disclosed within U.S. application Ser. No. 16/031,498 and/or as disclosed within U.S. application Ser. No. 16/031,506, both filed on Jul. 10, 2018, and the contents of both aforementioned applications are incorporated in their entirety herein by reference.

As best shown in FIG. 1, the reconfiguration and banding mechanism 65 also includes a plurality of bander units 170 and a compartment 175 coupled to an outer surface 180 of the first side support plate 80. In other embodiments, the plurality of bander units 170 and/or the compartment 175 can be coupled to any portion of the first support frame 70 and/or the second support frame 85. The compartment 175 is configured to hold one or more rolls of a second banding element 185 (FIG. 6) with each bander unit 170 coupled to the compartment 175 to move one banding element 185 through aligned channels 105 of the support plates 75, 80, 90, 95. In the illustrated embodiment, the second banding element 185 is different than the first banding element 44. For example, each second banding element 185 can be twine, strapping, wire, etc., which is different than the net wrap material of the first banding element 44. In other embodiments, the first and second banding elements 44, 185 can be similar but distinct from each other (e.g., the first banding element 44 can be a first strapping material, and the second banding element 185 can be a similar but distinct second strapping material). In one embodiment, each bander unit 170 can be at least one pinch roller that pulls the second banding element 185 from the compartment 175 and pushes the second banding element 185 through the four aligned channels 105 of the first and second support frames 70, 85. For example, each bander unit 170 can push one banding element 185 (e.g., one strap) through a portion of the channel 105 formed in the first side support plate 80, through an aligning channel 105 formed within the top support plate 90, through an aligning channel 105 formed within the second side support plate 95, through an aligning channel 105 formed in the bottom support plate 75, and through the remaining portion of the channel 105 formed in the first side support plate 80. In other embodiments, each bander unit 170 can push one banding element 185 in the other direction (e.g., from the bottom support plate 75, to the second side support plate 95, to the top support plate 90, and to the first side support plate 80). In further embodiments, each bander unit 170 can include a puller mechanism that is moveable within the four aligned channels 105 and operable to grip an end of the second banding element 185 and pull the second banding element 185 through the four aligned channels 105 of the first and second support frames 70, 85.

Figure 8:
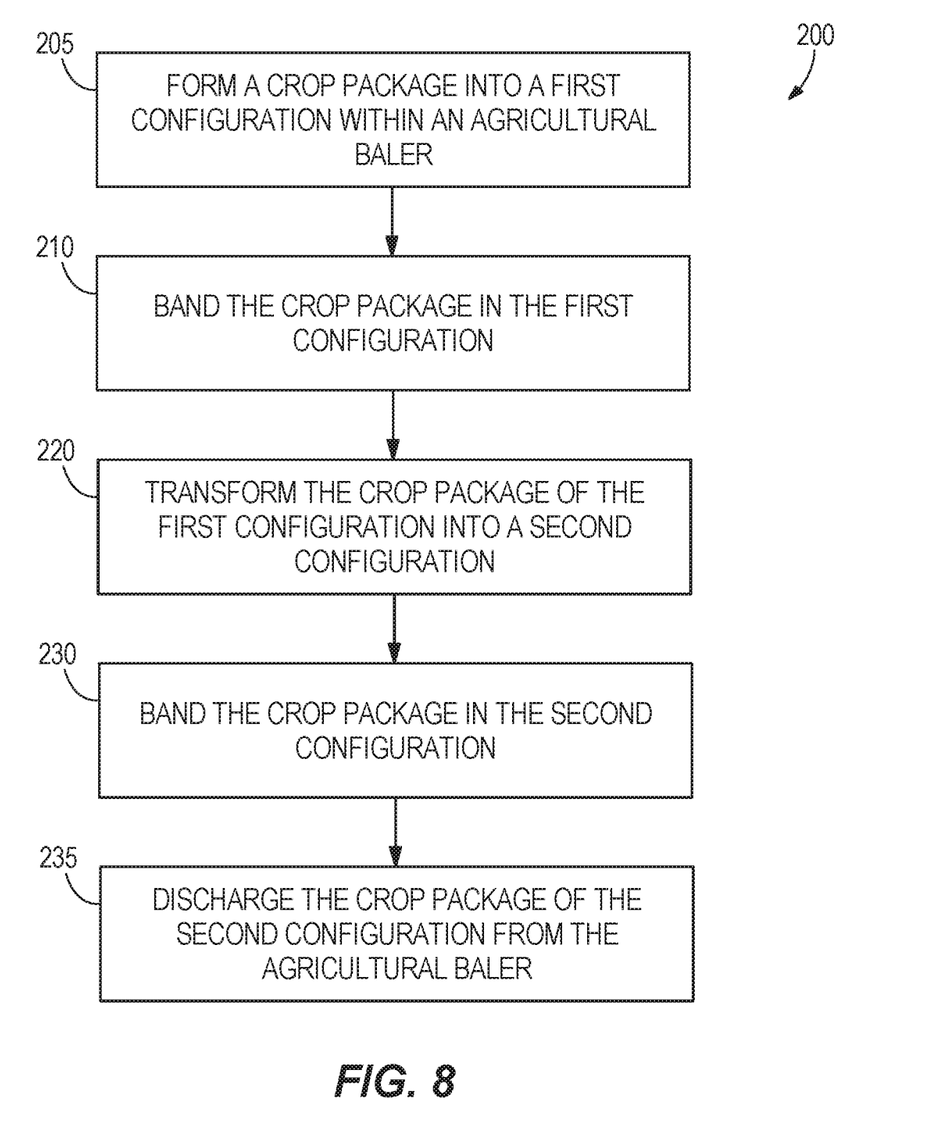
FIG. 8 is a flow diagram of a method of preparing a crop package to be discharged from the agricultural baler of FIG. 1.

FIG. 8 illustrates a method 200 of preparing a crop package to be discharged from the baler 10 as shown in FIGS. 2-7. The illustrated baler 10 is operable to form a crop package into a first configuration (e.g., a cylindrical-shaped crop package 41a; FIG. 1) within the formation chamber 40 (step 205; FIG. 8) as the baler 10 moves across the agricultural field. Once the baler 10 completely forms the crop package 41a within the formation chamber 40, the banding mechanism 42 bands the crop package 41a in the first configuration (step 210; FIG. 8) with the first banding element 44 to secure the crop package in a cylindrical shape before the crop package 41a is discharged from the formation chamber 40.

Figure 3:
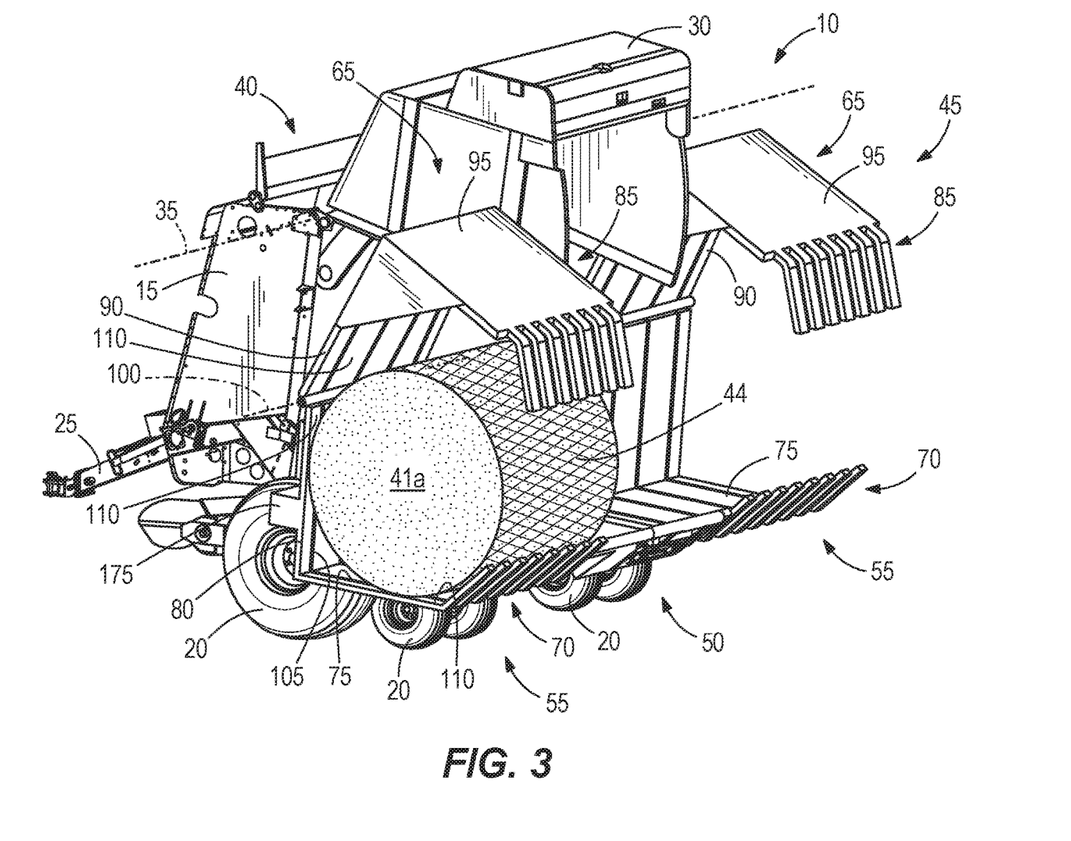
FIG. 3 is another view of the agricultural baler of FIG. 2 illustrating the first crop package in alignment with the crop package reconfiguration and banding mechanism.

With reference to FIG. 2, the gate 30 is moved to the open position allowing the cylindrical-shaped crop package 41a to be discharged from the formation chamber 40 and onto the middle section 50 of the accumulator 45. The cylindrical-shaped crop package 41a can then be moved to either the two side sections 55 by actuating the pushing mechanism 60 to move the cylindrical-shaped crop package 41a toward one of the two side sections 55 (FIG. 3).

Figure 5:
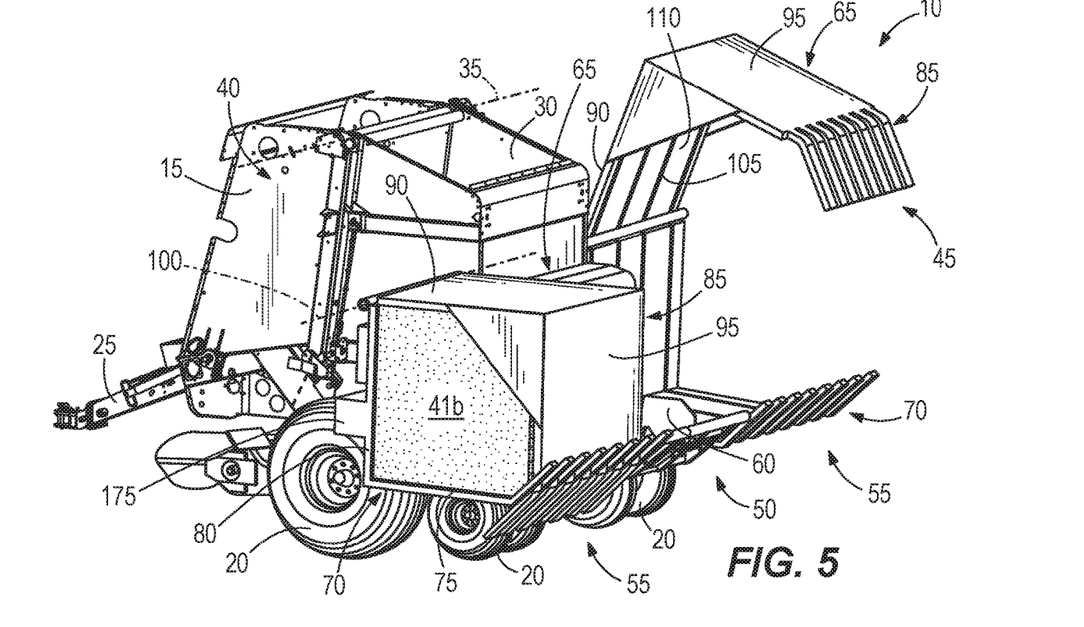
FIG. 5 is another view of the agricultural baler of FIG. 4 illustrating the crop package reconfiguration and banding mechanism in a second position.

The method 200 also includes a step 220 (FIG. 8) of transforming the cylindrical-shaped crop package 41a into a second configuration (e.g., a cuboid-shaped or noncylindrical-shaped crop package 41b different in shape to the cylindrical-shaped crop package 41a; FIGS. 4 and 5) by the reconfiguration and banding mechanism 65. In particular, the cylindrical-shaped crop package 41a is captured between the first and second support frames 70, 85 as the first and second support frames 70, 85 move relative to each other about the pivot axis 100 (FIG. 4) to reconfigure and compress the cylindrical-shaped crop package 41a into the cuboid-shaped crop package 41b (FIG. 5). As a result, sides of the cuboid-shaped crop package 41b are in direct contact with the abutting surfaces 110 of the support plates 75, 80, 90, 95 to hold the shape of the cuboid-shaped crop package 41b between the first and second support frames 70, 85. In other embodiments, the reconfiguration and banding mechanism 65 can transform the cylindrical-shaped crop package 41a into a substantially different-shaped crop package. For example, the reconfiguration and banding mechanism 65 can transform the cylindrical-shaped crop package 41a into a smaller cylindrical-shaped crop package, transform the cylindrical-shaped crop package 41a into a crop package having a planar side surface with a different geometry than a circle, square, rectangular, etc.

The illustrated reconfiguration and banding mechanism 65 is also operable to band the cuboid-shaped crop package 41b (step 230; FIG. 8). The bander units 170 are actuated (e.g., the pinch rollers are rotated in a first direction) to push the second banding elements 185 around the cuboid-shaped crop package 41b. The flexibility of the second banding elements 185 allows the banding elements 185 to easily transition between adjacent aligned channels 105. Once the bander units 170 push the second banding elements 185 one revolution around the cuboid-shaped crop package 41b, the bander units 170 tighten the second banding elements 185 onto the cuboid-shaped crop package 41b (e.g., the pinch rollers are rotated in a second direction).

Once the second banding elements 185 are tightened around the cuboid-shaped crop package 41b, ends of each banding element 185 are fastened together (e.g., by a clip, etc.) to secure the crop package 41b in the cuboid shape. As such, the cuboid-shaped crop package 41b includes both the first banding element 44 and the second banding elements 185 after step 230. In other embodiments, the reconfiguration and banding mechanism 65 can remove the first banding element 44 before banding the cuboid-shaped crop package 41b with the second banding elements 185. In further embodiments, step 230 can include the reconfiguration and banding mechanism 65 tightening the first banding element 44 to band the crop package in the cuboid shape such that the second banding elements 185 can be omitted.

Figure 6:
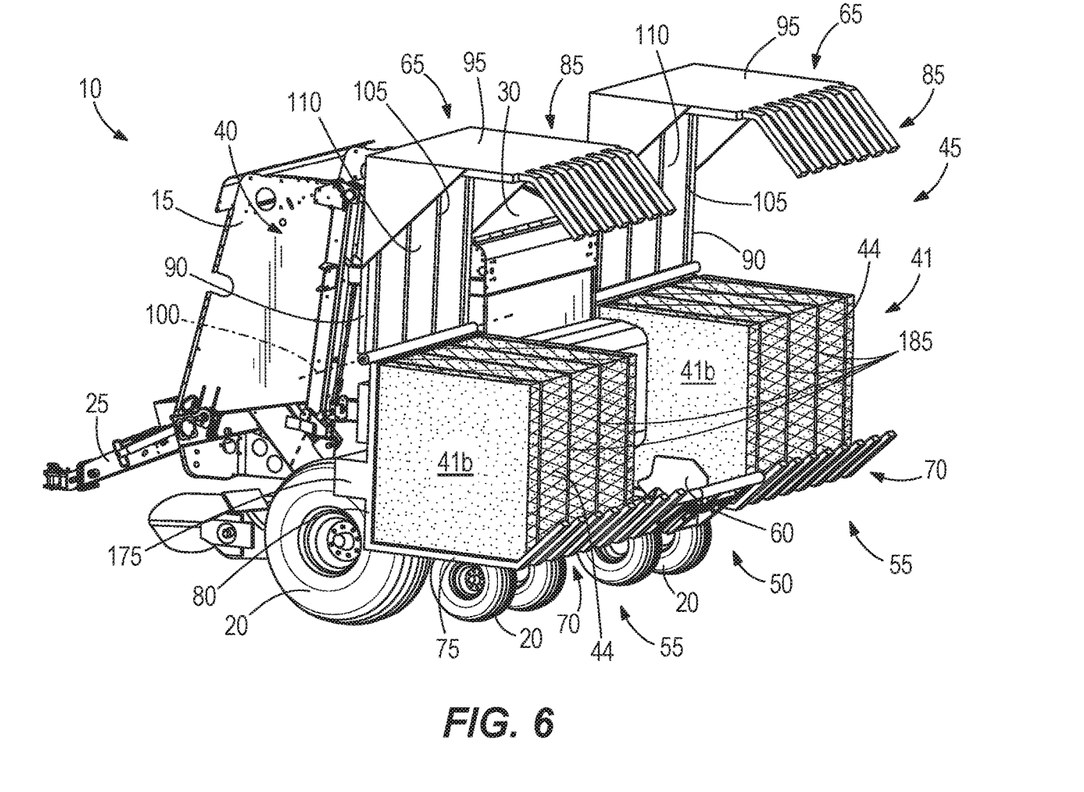
FIG. 6 is another view of the agricultural baler of FIG. 5 illustrating the accumulator supporting a first reconfigured crop package and a second reconfigured crop package.
Figure 7:
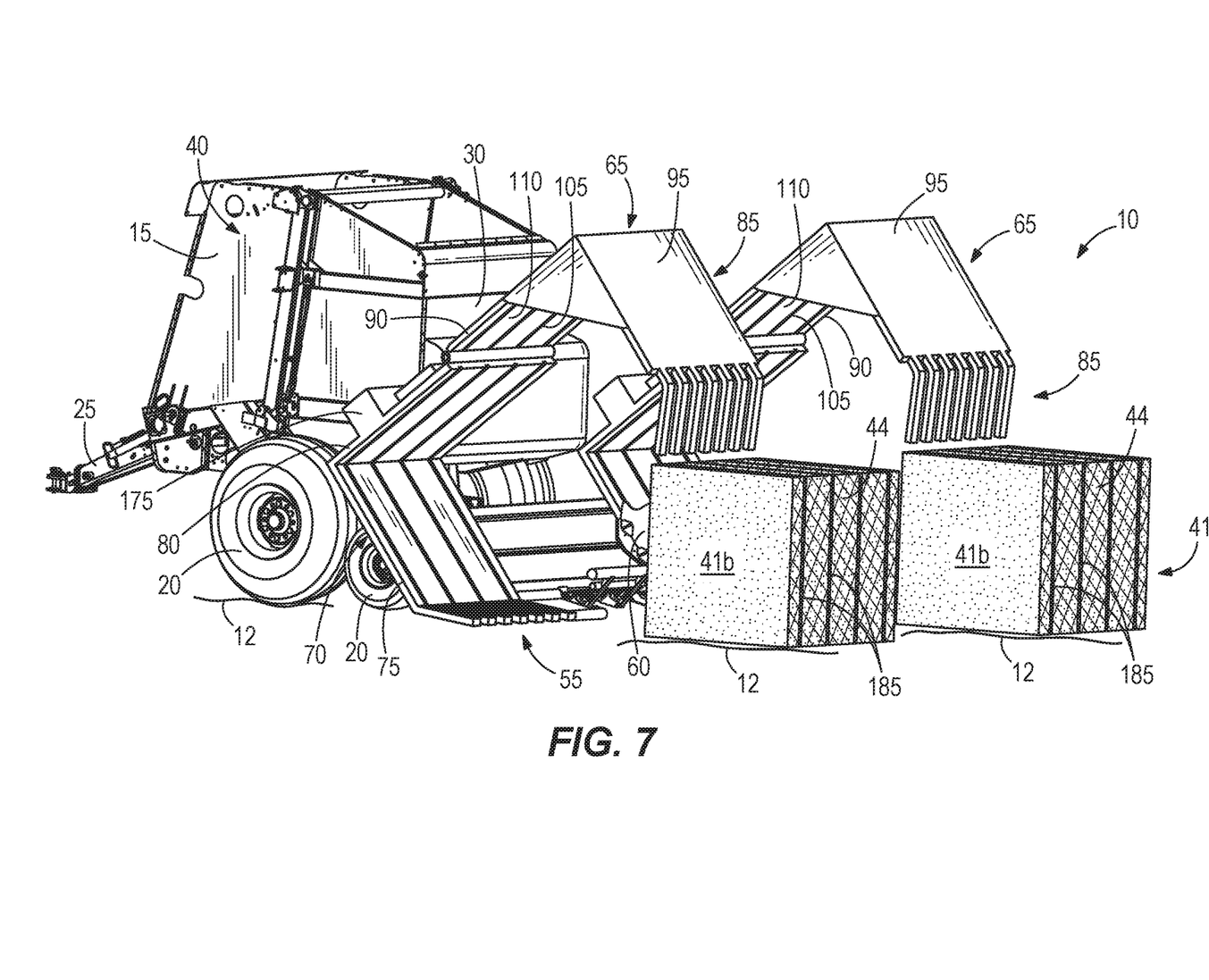
FIG. 7 is another view of the agricultural baler of FIG. 6 illustrating discharged first and second crop packages from the agricultural baler.

In the illustrated embodiment, a similar process can occur (i.e., steps 205, 210, 220, 230) for a second crop package such that the accumulator 45 can support two cuboid-shaped crop packages 41b (FIG. 6).

To discharge the two cuboid-shaped crop packages 41b from the baler 10 (step 235; FIG. 8), the second support frames 85 pivot away from the corresponding first support frame 70 (FIG. 6) allowing the cuboid-shaped crop packages 41b to be discharged from the baler 10. In one embodiment, the accumulator 45 can rotate relative to the chassis 15 of the baler 10 (FIG. 7) allowing the cuboid-shaped crop packages 41b to move (e.g., slide, roll, etc.) off the accumulator 45 and onto the agricultural field.

In the illustrated embodiment, the baler 10 includes two reconfiguration and banding mechanisms 65 such that a first cylindrical-shaped crop package 41a can be formed in the formation chamber 40, discharged onto the accumulator 45, moved to one of the side sections 55 by the pushing mechanism 60, reconfigured and compressed into a first cuboid-shaped crop package 41b, and banded into the cuboid shape. At any time after the first cylindrical-shaped crop package 41a is discharged from the formation chamber 40, the baler 10 can also form a second cylindrical-shaped crop package 41a in the formation chamber 40 to be discharged onto the accumulator 45, moved to the other side section 55 by the pushing mechanism 60, reconfigured and compressed into a second cuboid-shaped crop package 41b, and banded into the cuboid shape. As a result, the accumulator 45 can support two cuboid-shaped crop packages 41b at a time before discharging the cuboid-shaped crop packages from the baler 10.

In the embodiment with one reconfiguration and banding mechanism 65 located in the middle section 50 of the accumulator 45, the baler 10 is operable to form a first cylindrical-shaped crop package 41a in the formation chamber 40 to be discharged to the reconfiguration and banding mechanism 65. The reconfiguration and banding mechanism 65 then reconfigures and compresses the first cylindrical-shaped crop package 41a into a first cuboid-shaped crop package 41b and bands the first cuboid-shaped crop package 41b. The first cuboid-shaped crop package 41b is then moved to one of the two side sections 55 by the pushing mechanism 60. A similar process occurs when the baler 10 produces a second cylindrical-shaped crop package 41a in the formation chamber 40 to be discharged to the reconfiguration and banding mechanism 65 to be reconfigured and banded as a second cuboid-shaped crop package 41b before being moved to the other side section 55.

Figure 9:
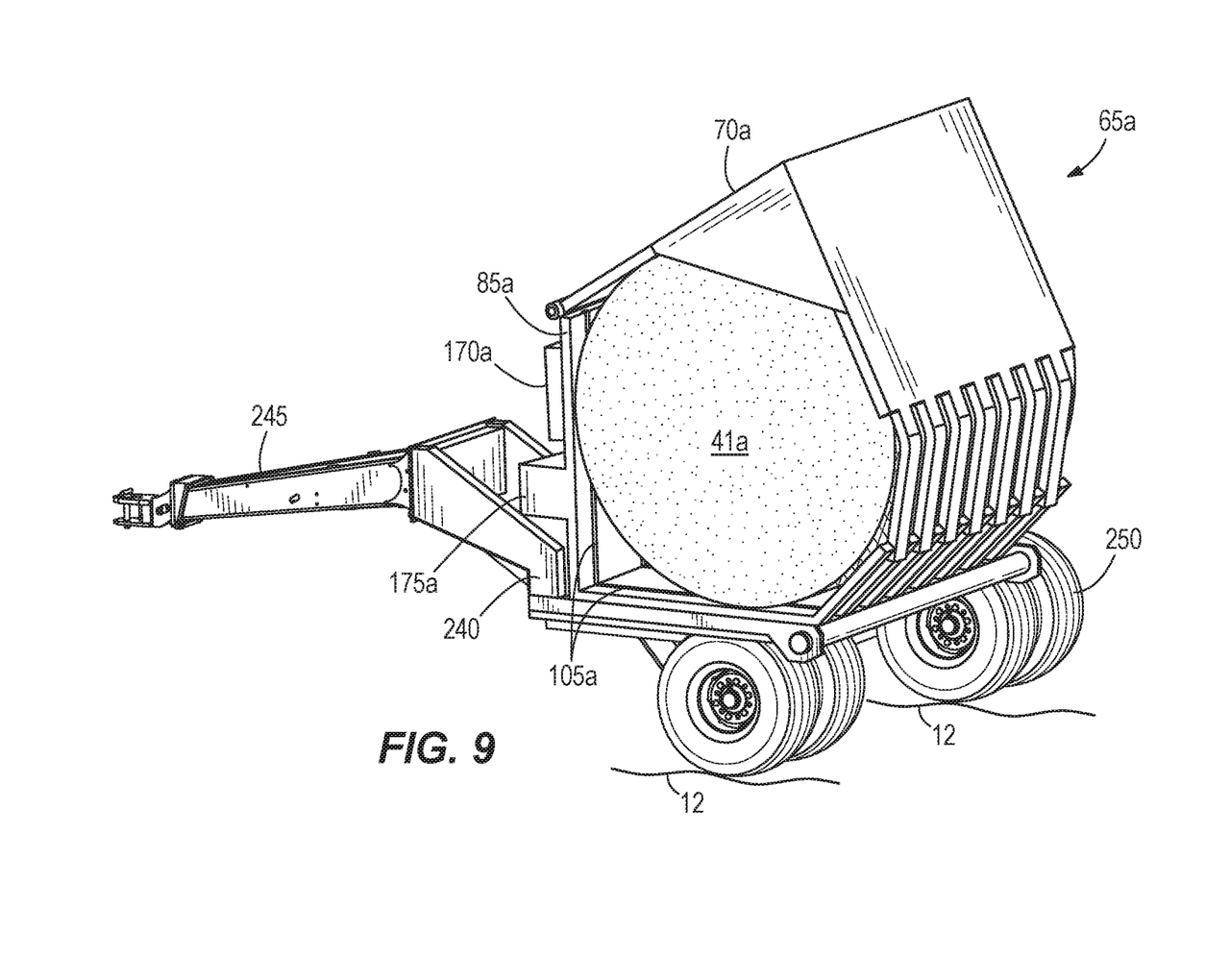
FIG. 9 is a perspective view of a crop package reconfiguration and banding mechanism according to another embodiment of the disclosure.

FIG. 9 illustrates a reconfiguration and banding mechanism 65a according to another embodiment. The reconfiguration and banding mechanism 65a is similar to the reconfiguration and banding system 65; therefore, similar components are designated with similar references numbers including the letter "a." At least some differences and/or at least some similarities between the reconfiguration and banding mechanisms 65, 65a will be discussed in detail below. In addition, components or features described with respect the reconfiguration and banding mechanism 65a are equally applicable to the reconfiguration and banding mechanism 65.

The reconfiguration and banding mechanism 65a is a separate machine from the baler 10 such that the baler system 68 is two distinct machines including the baler 10 and the reconfiguration and banding mechanism 65a. The reconfiguration and banding mechanism 65a includes a chassis 240 having a tongue 245 and wheels 250 allowing the reconfiguration and banding mechanism 65a to be mobile independently from the baler 10. For example, the reconfiguration and banding mechanism 65a can be towed behind a tractor to follow the baler 10 as the baler 10 operates. Once the baler 10 discharges a cylindrical-shaped crop package 215 (e.g., onto the agricultural surface), the reconfiguration and banding mechanism 65a is moved to the discharged crop package 215 to reconfigure and band it into a cuboid-shaped crop package 225. The reconfiguration and banding mechanism 65a can receive hydraulic and/or electrical power to form, band, and discharge the crop package 225 by the tractor towing the reconfiguration and banding mechanism 65a. In one embodiment, another machine (e.g., a tractor including a crop package pick) picks up the crop package 215 from the agricultural field and places the crop package 215 between first and second support frames 70a, 85a of the reconfiguration and banding system 65a for the reconfiguration and banding mechanism 65a to reconfigure and band it into a cuboid-shaped crop package 225. In other embodiments, the reconfiguration and banding mechanism 65a includes a collecting mechanism (e.g., hydraulic arms) that pick up the discharged crop package 215 and places it between the first and second support frames 70a, 85a. In other embodiments, the reconfiguration and banding mechanism 65a can be towed behind the baler 10 for the baler 10 to discharge a crop package directly to the reconfiguration and banding mechanism 65a. In further embodiments, the reconfiguration and banding mechanism 65a can include an engine, a drivetrain, an operator's cab, etc. such that the reconfiguration and banding mechanism 65a can operate and move under its own power without being towed behind another machine.

The illustrated reconfiguration and banding mechanism 65a also includes bander units 170a (one of which is shown in FIG. 9), a compartment 175a, and channels 105a to band the cuboid-shaped crop package 225. In particular, the reconfiguration and banding mechanism 65a forms and bands one crop package at a time (e.g., the reconfiguration and banding mechanism 65a receives a first cylindrical-shaped crop package 41a, forms the first cylindrical-shaped crop package 41a in a first cuboid-shaped crop package 41b, bands the first cuboid-shaped crop package 41b, and discharges the first cuboid-shaped crop package 41b before receiving a second cylindrical-shaped crop package 41a.

In further embodiments, such as the baler 10 that produces cuboid-shaped crop packages (e.g., a "square" baler) rather than cylindrical-shaped crop packages, the baler 10 can form a cuboid-shaped crop package within the formation chamber 40 and the reconfiguration and banding mechanism 65 can compress the cuboid-shaped crop package into a smaller, denser cuboid-shaped crop package.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. A system configured to prepare and band a crop package, the system comprising:
an agricultural baler including a formation chamber configured to form the crop package into a cylindrical shape, the agricultural baler also including a banding mechanism configured to band the cylindrical shaped crop package within the formation chamber in the cylindrical shape with a first banding element; and
a reconfiguration and bander assembly coupled to the agricultural baler, the reconfiguration and bander assembly configured to form the banded cylindrical shaped crop package into a cuboid shaped crop package before banding the cuboid shaped crop package in the cuboid shape with a second banding element, wherein the cuboid shaped crop package is a square shaped crop package.

2. The system of claim 1, wherein the reconfiguration and bander assembly is configured to discharge the crop package in the cuboid shape banded with both the first banding element and the second banding element, and wherein the first banding element is a different banding element than the second banding element.

3. The system of claim 1, further comprising an accumulator coupled to the agricultural baler and the reconfiguration and bander assembly, wherein the accumulator is configured to receive the crop package in the cylindrical shape from the formation chamber, and wherein a slider of the accumulator is configured to move the crop package in the cylindrical shape toward the reconfiguration and bander assembly.

4. The system of claim 1, wherein the reconfiguration and bander assembly includes a plurality of support members, each of which includes a channel formed into an abutting surface of the corresponding support member, wherein the abutting surface of each support member is configured to contact the crop package, and wherein the reconfiguration and bander assembly includes a bander unit configured to move the second banding element through the channel of each support member to band the crop package in the cuboid shape.

5. A system configured to prepare and band a crop package, the system comprising:
an agricultural baler configured to move relative to a surface, the agricultural baler including a formation chamber configured to form the crop package into a cylindrical shape, the agricultural baler also including a banding mechanism configured to band the cylindrical shaped crop package within the formation chamber in the cylindrical shape with a first banding element; and
a mobile reconfiguration and bander assembly configured to move relative to the surface, the reconfiguration and bander assembly configured to form the banded cylindrical shaped crop package into a cuboid shaped crop package before banding the cuboid shaped crop package in the cuboid shape with a second banding element, wherein the cuboid shaped crop package is a square shaped crop package.

6. The system of claim 5, wherein the reconfiguration and bander assembly is configured to discharge the crop package in the cuboid shape banded with both the first banding element and the second banding element, and wherein the first banding element is a different banding element than the second banding element.

7. The system of claim 5, wherein the reconfiguration and bander assembly is coupled to the agricultural baler for movement with the agricultural baler relative to the surface.

8. The system of claim 7, further comprising an accumulator coupled to the agricultural baler and the reconfiguration and bander assembly, wherein the accumulator is configured to receive the crop package in the cylindrical shape from the formation chamber, and wherein a slider of the accumulator is configured to move the crop package in the cylindrical shape toward the reconfiguration and bander assembly.

9. The system of claim 8, wherein the reconfiguration and bander assembly includes a plurality of support members, each of which includes a channel formed into an abutting surface of the corresponding support member, wherein the abutting surface of each support member is configured to contact the crop package in the cuboid shape, and wherein the reconfiguration and bander assembly includes a bander unit configured to move the second banding element through the channel of each support member to band the crop package in the cuboid shape.

10. The system of claim 5, wherein the agricultural baler and the reconfiguration and bander assembly are configured to be moveable relative to each other.

11. The system of claim 10, wherein the reconfiguration and bander assembly includes a wheel coupled to a chassis to support the reconfiguration and bander assembly on the surface.

12. The system of claim 11, wherein the reconfiguration and bander assembly includes a plurality of support members, each of which includes a channel formed into an abutting surface of the corresponding support member, wherein the abutting surface of each support member is configured to contact the crop package in the cuboid shape, and wherein the reconfiguration and bander assembly includes a bander unit configured to move the second banding element through the channel of each support member to band the crop package in the cuboid shape.

13. The system of claim 12, wherein the reconfiguration and bander assembly includes first and second pairs of support members, and wherein the first pair of support members is configured to pivot relative to the second pair of support members about an axis to form the crop package into the cuboid shape.

14. A method of preparing and banding a crop package, the method comprising:
 forming the crop package into a cylindrical shape within a formation chamber of an agricultural baler;
 banding the cylindrical shaped crop package within the formation chamber in the cylindrical shape with a first banding element;
 moving a reconfiguration and bander assembly relative to an agricultural surface supporting the agricultural baler;
 forming the banded cylindrical shaped crop package into a cuboid shaped crop package with the reconfiguration and bander assembly; and
 after forming the cylindrical shaped crop package into the cuboid shaped crop package, banding the cuboid shaped crop package in the cuboid shape with the reconfiguration and bander assembly using a second banding element, wherein the cuboid shaped crop package is a square shaped crop package.

15. The method of claim 14, further comprising discharging the crop package from the reconfiguration and bander assembly in the cuboid shape banded with both the first banding element and the second banding element, and wherein banding the crop package in the cuboid shape further includes banding the crop package in the cuboid shape with the second banding element a different banding element than the first banding element.

16. The method of claim 14, further comprising moving the second banding element through a plurality of channels formed into a plurality of abutting surfaces of the reconfiguration and bander assembly to band the crop package into the cuboid shape.

17. The method of claim 14, further comprising coupling the reconfiguration and bander assembly to the agricultural baler such that the agricultural baler and the reconfiguration and bander assembly concurrently move relative to the agricultural surface.

18. The system of claim 1, wherein the reconfiguration and bander assembly includes four planar surfaces configured to contact the cylindrical shaped crop package to form the cuboid shape crop package.

19. The system of claim 5, wherein the reconfiguration and bander assembly is configured to discharge the crop package in the cuboid shape banded with both the first banding element and the second banding element.

20. The method of claim 14, wherein forming the crop package into the cuboid shape includes forming the crop package into the cuboid shape using four planar surfaces of the reconfiguration and bander assembly.

* * * * *